US010097346B2

(12) United States Patent
Wood et al.

(10) Patent No.: US 10,097,346 B2
(45) Date of Patent: Oct. 9, 2018

(54) KEY CATALOGS IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 173 days.

(21) Appl. No.: 14/964,423

(22) Filed: Dec. 9, 2015

(65) Prior Publication Data
US 2017/0170955 A1 Jun. 15, 2017

(51) Int. Cl.
*H04L 9/08* (2006.01)
*H04L 9/00* (2006.01)
*H04L 9/32* (2006.01)
*H04L 29/06* (2006.01)

(52) U.S. Cl.
CPC .......... *H04L 9/0819* (2013.01); *H04L 9/3236* (2013.01); *H04L 9/3247* (2013.01); *H04L 63/061* (2013.01); *H04L 63/123* (2013.01); *H04L 63/1441* (2013.01)

(58) Field of Classification Search
CPC . H04L 9/0819; H04L 63/1441; H04L 63/123; H04L 9/3247; H04L 9/3236; H04L 63/061
USPC .......... 380/278, 44; 713/168, 171, 176, 180, 713/181
See application file for complete search history.

(56) References Cited

U.S. PATENT DOCUMENTS

| 817,441 A | 4/1906 | Niesz |
| 4,309,569 A | 1/1982 | Merkle |
| 4,921,898 A | 5/1990 | Lenney |

(Continued)

FOREIGN PATENT DOCUMENTS

| CN | 103873371 | 6/2014 |
| DE | 1720277 A1 | 6/1967 |

(Continued)

OTHER PUBLICATIONS

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

(Continued)

*Primary Examiner* — Aravind K Moorthy

(57) ABSTRACT

One embodiment provides a system that facilitates efficient key retrieval by using key catalogs in a content centric network. During operation, the system generates, by a client computing device, a first interest for a key indicated in a signed key catalog. In response to receiving the key, the system verifies the received key by determining that a hash of the received key matches a hash of the key as indicated in the catalog based on a name for the received key. The system generates a second interest for a content object, wherein a name for the second interest includes a name prefix associated with the key as indicated in the catalog, wherein the first interest is transmitted before or concurrent with transmitting the second interest. In response to receiving the content object, the system verifies the received content object based on the key.

20 Claims, 8 Drawing Sheets

(56) References Cited

U.S. PATENT DOCUMENTS

| | | | |
|---|---|---|---|
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 * | 7/2005 | Mattis ............... G06F 17/30067 |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |

(56) References Cited

U.S. PATENT DOCUMENTS

| | | |
|---|---|---|
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,697,363 B1 * | 7/2017 | Dorwin ............... G06F 21/60 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0053302 A1 * | 3/2006 | Yasaki ............... H04L 9/0822 |
| | | 713/183 |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0174309 A1 * | 7/2007 | Pettovello ......... G06F 17/30327 |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0101610 A1 * | 5/2008 | Birk .................... H04L 9/0891 |
| | | 380/277 |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |

(56) References Cited

U.S. PATENT DOCUMENTS

| | | |
|---|---|---|
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0179040 A1* | 7/2011 | Bessonov ......... G06F 17/30876 |
| | | 707/747 |
| 2011/0202609 A1 | 8/2011 | Chaturvedi |
| 2011/0219093 A1 | 9/2011 | Ragunathan |
| 2011/0219235 A1* | 9/2011 | Takahashi ............... G06F 17/30 |
| | | 713/176 |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |

(56) References Cited

U.S. PATENT DOCUMENTS

| | | |
|---|---|---|
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1* | 9/2014 | Zhang .................. H04L 9/3268 713/158 |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0280918 A1 | 10/2015 | Uzun et al. |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0065362 A1* | 3/2016 | Choyi .................. H04L 63/065 380/279 |

(56) References Cited

U.S. PATENT DOCUMENTS

2016/0110466 A1 4/2016 Uzun
2016/0171184 A1 6/2016 Solis

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David R. Choffnes, Aleksandar Kuzmanovic, and Fabian E. Bustamante. Drafting Behind Akamai: Inferring Network Conditions Based on CDN Redirections. IEEE/ ACM Transactions on Networking {Feb., 2009).
"PBC Library-Pairing-Based Cryptography-About," http://crypto.stanford.edu/pbc. downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer ScienceVolume 5443 (2009).
Gopal et al. "Integrating content-based Mechanisms with hierarchical File systems", Feb. 1999, University of Arizona, 15 pages.

(56) References Cited

OTHER PUBLICATIONS

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' Infocom 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.

(56) References Cited

OTHER PUBLICATIONS

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012}.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2013.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

(56) References Cited

OTHER PUBLICATIONS

S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56 . . . .
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Paris'S, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Extended European Search Report and Written Opinion in counterpart European Application No. 16201582.0, dated May 11, 2017, 9 pages.

\* cited by examiner

KEY CATALOGS IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014 (hereinafter "U.S. patent application Ser. No. 14/231,515");

the disclosures of which are herein incorporated by reference in their entirety.

BACKGROUND

Field

This disclosure is generally related to the secure and efficient distribution of digital content. More specifically, this disclosure is related to a system for publishing a key catalog that enumerates key information for content offered by a producer to consumers.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients and consumers, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A CCN content object can be signed by a producer. The content object can contain information necessary to request, locate, or identify the cryptographic keys needed to verify the signature of the producer of the content object. In order to verify the signature of a received content object, a consumer must either possess prior knowledge of the keys, or retrieve the keys based on the information included in the content object. The first approach (prior key knowledge) may be infeasible, as it is unlikely that a consumer will have knowledge of all possible producers and their signing certificate or keys prior to issuing an interest. The second approach (individual key retrieval) may introduce significant overhead, e.g., verifying a public key may require traversing a certificate chain, where each node in the chain requires another interest-content exchange. Neither approach provides an efficient system for obtaining the relevant keys for content published by a producer.

SUMMARY

One embodiment provides a system that facilitates efficient key retrieval by using key catalogs in a content centric network. During operation, the system generates, by a client computing device, a first interest for a key indicated in a signed key catalog. In response to receiving the key, the system verifies the received key by determining that a hash of the received key matches a hash of the key as indicated in the catalog based on a name for the received key. The system generates a second interest for a content object, wherein a name for the second interest includes a name prefix associated with the key as indicated in the catalog, wherein the first interest is transmitted before or concurrent with transmitting the second interest. In response to receiving the content object, the system verifies the received content object based on the key.

In some embodiments, the system generates an initial interest for the signed key catalog, wherein the catalog is digitally signed with a private key of a content producing device of the catalog. In response to receiving the signed key catalog, the system verifies the signature based on a public key of the content producing device of the catalog.

In some embodiments, the catalog is a content object with a name that is a hierarchically structured variable length identifier which comprises contiguous name components ordered from a most general level to a most specific level.

In some embodiments, the catalog indicates a collection of key sets, wherein a key set indicates one or more keys based on a name prefix associated with a respective key, a name for the respective key, and a hash of the respective key.

In some embodiments, a name for the first interest includes a name for the first key as indicated in the catalog, and the first interest indicates a hash restriction equal to a hash of the first key as indicated in the catalog.

In some embodiments, the system stores the received key in a data structure based on the name for the received key and a name prefix associated with the received key as indicated in the catalog.

In some embodiments, the system verifies the received content object by obtaining the key from a data structure. The system looks up in the catalog the name prefix included in the second interest to obtain the name of a corresponding key, and the system also looks up in the data structure the name of the corresponding key to obtain the corresponding key.

In some embodiments, the system stores, for each of one or more keys indicated in the catalog, in a data structure a mapping between a name prefix associated with a respective key, a name for the respective key, and a hash of the respective key.

In some embodiments, the system verifies the received content object by obtaining the key from a data structure. The system looks up in the data structure the name prefix included in the second interest and the name of the corresponding key to obtain the corresponding key.

In another embodiment, the system creates, by a content producing device, a key catalog that indicates a collection of key sets, wherein a key set indicates one or more keys based on a name prefix associated with a respective key, a name for the respective key, and a hash of the respective key. The system produces a digital signature for the key catalog based on a private key of the content producing device of the catalog, thereby facilitating efficient key retrieval by a client computing device.

In a variation on this embodiment, in response to receiving an interest for the digitally signed key catalog, the system transmits the catalog to a client computing device.

BRIEF DESCRIPTION OF THE FIGURES

In the figures, like reference numerals refer to the same figure elements.

DETAILED DESCRIPTION

Figure 1:
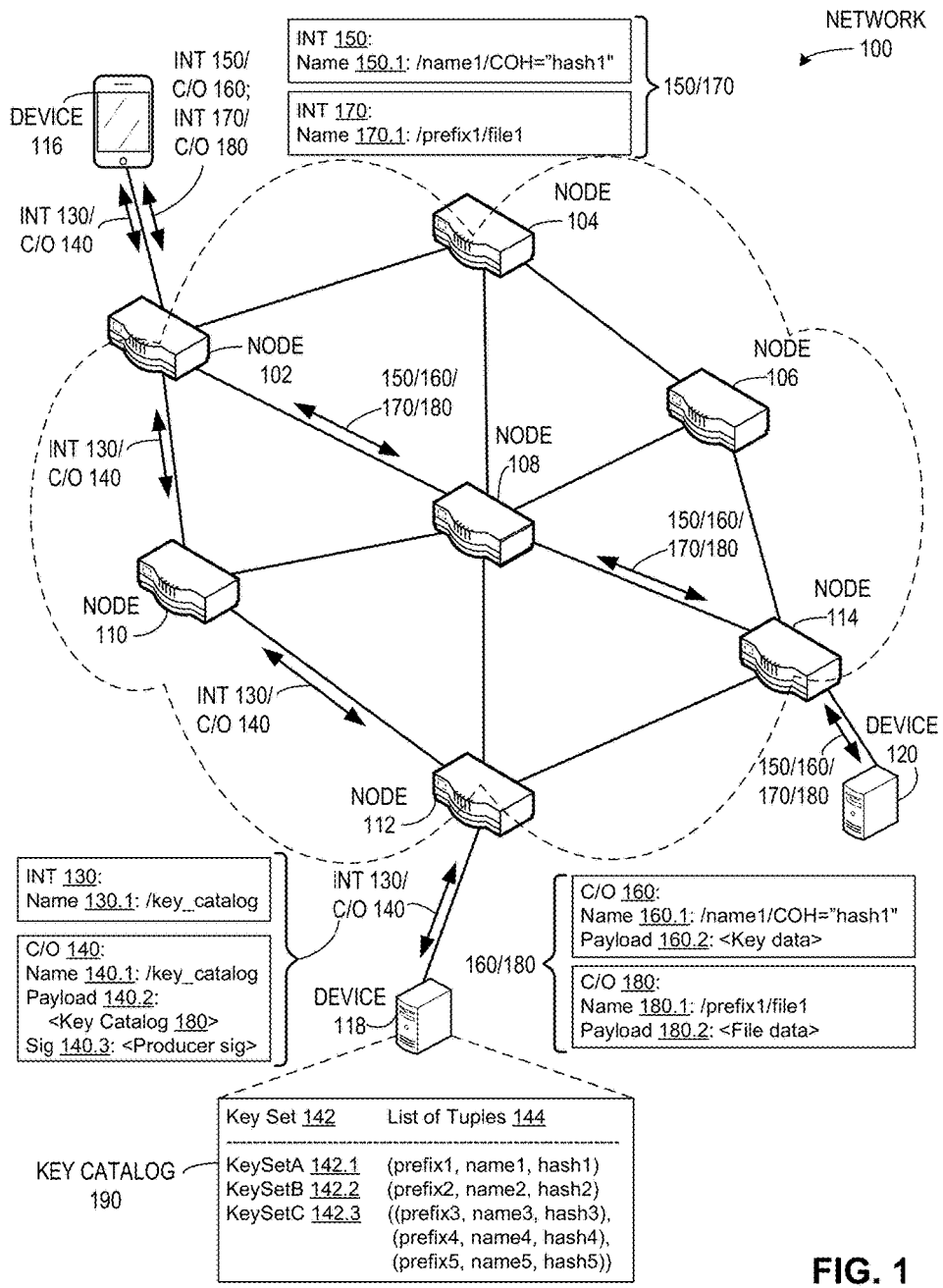
FIG. 1 illustrates an exemplary network that facilitates efficient key retrieval in a CCN, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of efficient key retrieval in a CCN by providing a system that allows a producer to publish a key catalog that indicates the key information for content offered by the producer to consumers. The key information in the key catalog allows a consumer to obtain a key for a corresponding name prefix either before or in parallel with requesting content under the name prefix. This removes the delay introduced by an extra (and sequential) interest for the verification key after the content is returned. The key catalog can be a single, signed CCN content object, such as a manifest, which contains one or more arbitrary key sets owned or trusted by the producer. CCN manifests are described in U.S. patent application Ser. No. 14/231,515, which disclosure is herein incorporated by reference in its entirety. A key set is an ordered and named collection of one or more key tuples, and a key tuple identifies a key based on the name prefix associated with the key, the name for the key, and the hash of the key (e.g., "(name prefix, key name, key hash)").

Upon receiving and verifying the key catalog, a consumer can send one interest for content corresponding to a name prefix indicated in the catalog, and can also send (either before or concurrently with the interest for content) another interest for the key corresponding to that name prefix based on information from the relevant tuple. For example, if the relevant tuple is "(p1, n1, h1)," a consumer can issue an interest for a file under the "p1" namespace (e.g., "/p1/file"), and, either concurrently with or in advance of sending that interest, issue another interest for the key with the name "n1" and a hash of "h1." When the consumer receives the requested content, the consumer may already possess the key needed to verify the requested content. Thus, by providing the consumer with an efficient mechanism to retrieve the corresponding key (e.g., either in advance or concurrent with the content retrieval), the system removes the need for an additional and sequential interest and content object exchange for the key.

The key catalog indicates key sets which indicate key tuples (as depicted below in relation to FIGS. 2A-2D. A tuple within a key set is individually addressable by its index within the collection. A key set may be embedded within the catalog or linked via their name and key ID or content object hash. Similar, a tuple may be embedded within a key set, and an individual key may be embedded within a tuple. Thus, upon receiving and verifying the key catalog, a consumer can recursively resolve all key tuples linked to from the key catalog and subsequently issue an interest for each corresponding key (as described below in relation to FIG. 2D). The consumer can store these keys in a key buffer for later use. For example, for the tuple of "(p2, n2, and h2)," if the consumer has previously requested, received, and stored the key corresponding to the namespace "p2" (e.g., the content object with the name "n2" and a content object hash of "h2"), the consumer can simply send out an interest for content corresponding to the name prefix "p2" (e.g., "/p2/file"). Upon receiving the responsive content object with the name "/p2/file," the consumer can look up in the key buffer the corresponding key (e.g., corresponding to "n2") and subsequently verify the content object signature on the responsive content object based on the previously stored key.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Environment

FIG. 1 illustrates an exemplary network that facilitates efficient key retrieval in a CCN, in accordance with an embodiment of the present invention. Network 100 can include a content requesting device 116, content producing devices 118 and 120, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). During operation, client computing device 116 can generate and send an interest 130 with a name 130.1 of "/key_catalog." Interest 130 can travel through a network (such as a CCN) via nodes or routers 102, 110, and 112, finally reaching content producing device or producer 118. Producer 118 can generate and transmit a responsive content object 140 with a name 140.1 of "/key_catalog" and include a payload 140.2 and a signature 140.3. Payload 140.2 can correspond to a key catalog 180, which can be a table where each entry includes a key set 142 and a list of tuples 144. For example: a KeySetA 142.1 can include the tuple "(prefix1, name1, hash1)"; a KeySetB 142.2 can include the tuple "(prefix2, name2, hash2)"; and a KeySetC can include the list of tuples "(prefix3, name3, hash3), (prefix4, name4, hash4), and (prefix5, name5, hash5)." Content object 140 can travel back to device 116, via the reverse path as interest 130 (e.g., to nodes 112, 110, and 102 before reaching device 116.

Upon receiving content object 140 (e.g., key catalog 190), device 116 may either obtain all corresponding keys based on the catalog, store the keys in a key buffer, and then issue interests for content corresponding to the name prefixes in the catalog, or, concurrently send out an interest for content corresponding to a name prefix and an interest for the corresponding key. For example, device 116 can obtain a key based on KeySetA 142.1 of key catalog 190 by issuing an interest 150 which has a name of 150.1 that includes the name of the key ("name1") and a content object hash ("COH") restriction with a value equal to "hash1." The COH can also be included in a field other than the name. Interest 150 can travel through the network (e.g., via nodes 102, 108, and 114) before reaching device 120, which can return the responsive content object or key 160 to device 116. Note that either the producer of key catalog 190 (e.g., device 118) or any other device (e.g., device 120) may be the producer which returns the actual key. Device 116 can store content object or key 160 in a data structure such as a key buffer, which can indicate the name prefix, key name, and the hash of the key. The key buffer can be created based on the catalog only, e.g., prior to obtaining the actual key.

Subsequent to or concurrent with issuing interest 150, device 116 can issue an interest 170 with the name "/prefix1/file1" and receive a responsive content object 180. The name prefix for this interest (e.g., "/prefix1") corresponds to the tuple indicated by KeySetA 142.1 in key catalog 190. Content object 180 can include a signature of producer 120. Device 116 can verify the signature on content object 180 by using the corresponding key 160 from the key buffer.

Thus, the key catalog enables a consumer to obtain the appropriate key either before or in parallel with requesting content objects under a specific namespace. This creates a more efficient system by eliminating any time required to send an additional and sequential interest for the verification key after the content is received.

Exemplary Format of a Key Catalog and a Key Buffer

Figure 2A:
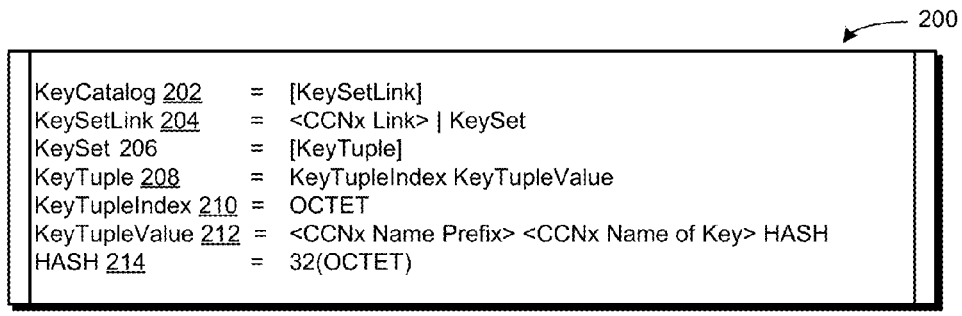
FIG. 2A presents a table depicting a format of a key catalog, in accordance with an embodiment of the present invention.

FIG. 2A presents a table depicting a format of a key catalog 200, in accordance with an embodiment of the present invention. Catalog 200 is illustrated in Augmented Backus-Naur Form (ABNF) notation and can include a KeyCatalog 202 field which is a list of KeySetLinks. A KeySetLink 204 can include information to identify a "CCNx link" and a KeySet. A KeySet 206 can include a list of KeyTuples, and a KeyTuple 208 can include a KeyTupleIndex and a KeyTupleValue. A KeyTupleIndex 210 can be a number such as an OCTET, while a KeyTupleValue 212 can include the CCNx name prefix, the CCNx name of the key, and a HASH. A HASH 214 can be a number such as a 32(OCTET).

Figure 2B:
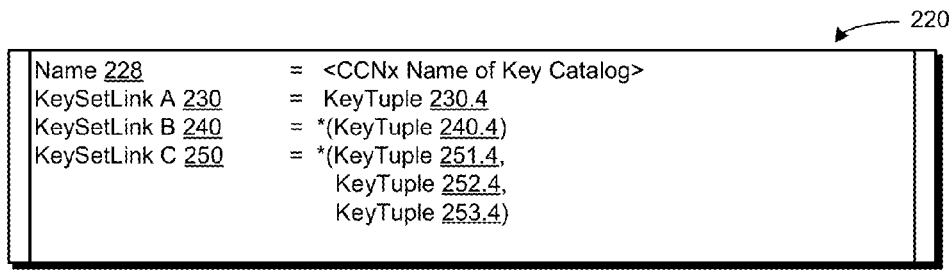
FIG. 2B presents a table depicting a format of a key catalog, in accordance with an embodiment of the present invention.

FIG. 2B presents a table depicting a format of a key catalog 220, in accordance with an embodiment of the present invention. Catalog 220 can include a name 228 which is the "CCNx Name of Key Catalog" along with 3 KeySetLinks: a KeySetLinkA 230 which includes the KeyTuple 230.4; a KeySetLinkB 240 which includes a link to the KeyTuple 240.4; and a KeySetLinkC 250 which includes a link to three KeyTuples 251.4, 252.4, and 253.4.

Figure 2C:
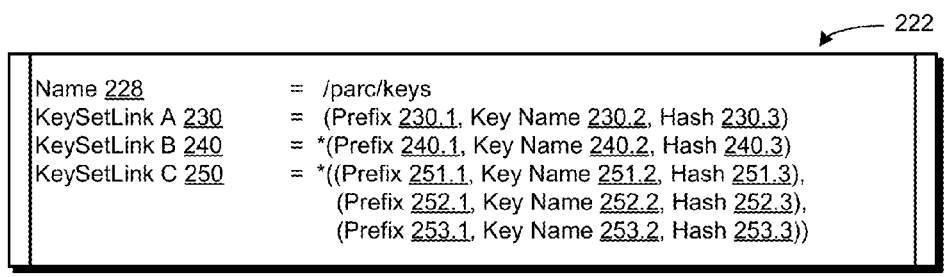
FIG. 2C presents a table depicting a format of a key catalog, in accordance with an embodiment of the present invention.

FIG. 2C presents a table depicting a format of a key catalog 222, in accordance with an embodiment of the present invention. Catalog 222 can include a name 228 with a value of "/parc/keys" and three KeySetLinks which correspond to KeySetLinkA 230, KeySetLinkB 240, and KeySetLinkC 250 of FIG. 2B. KeySetLinkA 230 can include a tuple identified by "(Prefix 230.1, Key Name 230.2, Hash 230.3)"; KeySetLinkB 240 can include a link to a tuple identified by "(Prefix 240.1, Key Name 240.2, Hash 240.3)"; and KeySetLinkC 250 can include a link to three tuples, "(Prefix 251.1, Key Name 251.2, Hash 251.3), (Prefix 252.1, Key Name 252.2, Hash 252.3), and (Prefix 253.1, Key Name 253.2, Hash 253.3)."

Figures 2D, 2E:
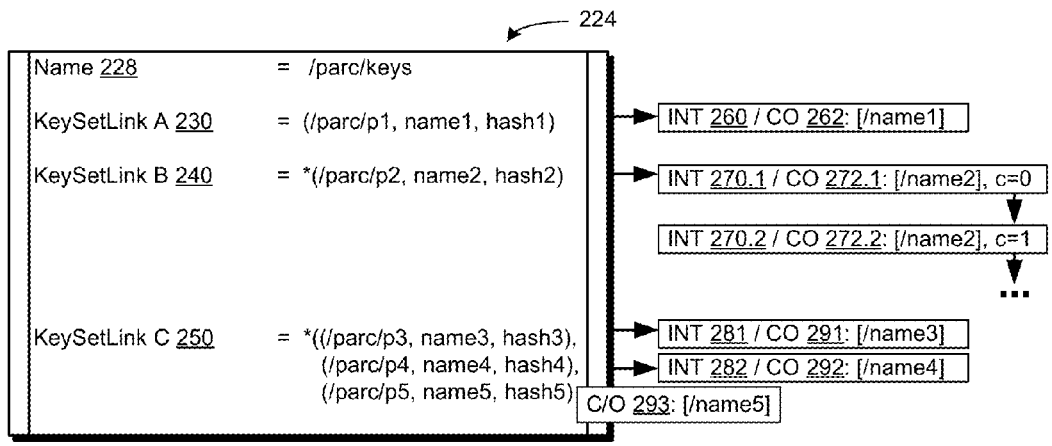
FIG. 2D presents an exemplary key catalog, in accordance with an embodiment of the present invention.
FIG. 2E presents a data structure that stores keys and other corresponding information, in accordance with an embodiment of the present invention.

FIG. 2D presents an exemplary key catalog 224, in accordance with an embodiment of the present invention. Catalog 224 can include a name 228 with a value of "/parc/keys" and three KeySetLinks which correspond to KeySetLinkA 230, KeySetLinkB 240, and KeySetLinkC 250 of FIG. 2C. KeySetLinkA 230 can include a tuple with a value of "(/parc/p1, name1, hash1)"; KeySetLinkB 240 can include a link to a tuple with a value of "(/parc/p2, name2, hash2)"; and KeySetLinkC 250 can include a link to three tuples with respective values of "(/parc/p3, name3, hash3), (/parc/p4, name4, hash4), and (/parc/p5, name5, hash5)." A consumer in possession of catalog 224 can recursively resolve all key tuples linked to from catalog 224 and then issue an interest for each corresponding key. For example, in catalog 224, the tuple for KeySetLinkA 230 is linked and not embedded in the key set. A consumer can issue an interest 260 with a name of "/name1" and a COH of "hash1" and receive a responsive content object 262. The consumer can store content object 262 (e.g., key 262) in a key buffer. In addition, KeySetB 240 of catalog 224 is a link to a chunked key stream, i.e., a series of named content object keys that are partitioned based on a chunking protocol. The consumer can issue an interest 270.1 with a name of "/name2," a COH of "hash2," and a first chunk segment equal to "0," which returns a responsive content object 272.1 or key 272.1 The consumer can then issue interests for the remaining chunks. For example, the consumer can issue an interest 270.2 with a name of "/name2," a COH of "hash2," and a second chunk number equal to "1," which returns a responsive content object 272.2 or key 272.2. The chunked content object keys (e.g., keys 272.1 and 272.2) can be stored in the key buffer. Furthermore, KeySetLinkC 250 is a link to three key tuples, where the first two key tuples are linked by name and keyID or hash, and the third key is embedded within the set. The consumer can issue an interest 281 with a name of "/name3" and a COH of "hash3" and receive a responsive content object or key 291. The consumer can also issue an interest 282 with a name of "/name4" and a COH of "hash4" and receive responsive content object or key 292. Note that content object or key 293 is embedded within the key set, so the consumer does not need to issue an interest to retrieve it. The consumer can store content objects or keys 291, 292, and 293 in the key buffer. In this manner, the consumer can recursively resolve all key tuples indicated in the key catalog, and store the corresponding keys for later use.

FIG. 2E presents a data structure or key buffer 226 that stores keys and other corresponding information, in accordance with an embodiment of the present invention. Key buffer 226 can be a table where each entry includes a key name 294 and a corresponding key content object 296. For example, one entry in key buffer 226 can include a key name of "name1" and the corresponding key content object with a name of "name1" and a COH value of "hash1." Key buffer 226 can also store the name prefix information associated with the key (not shown in FIG. 2E). Alternatively, the information from the indicated tuples in the key catalog can be stored in another data structure that is separate from the key buffer.

Client Computing Device Retrieves and Uses Keys Indicated in Key Catalog

Figure 3:
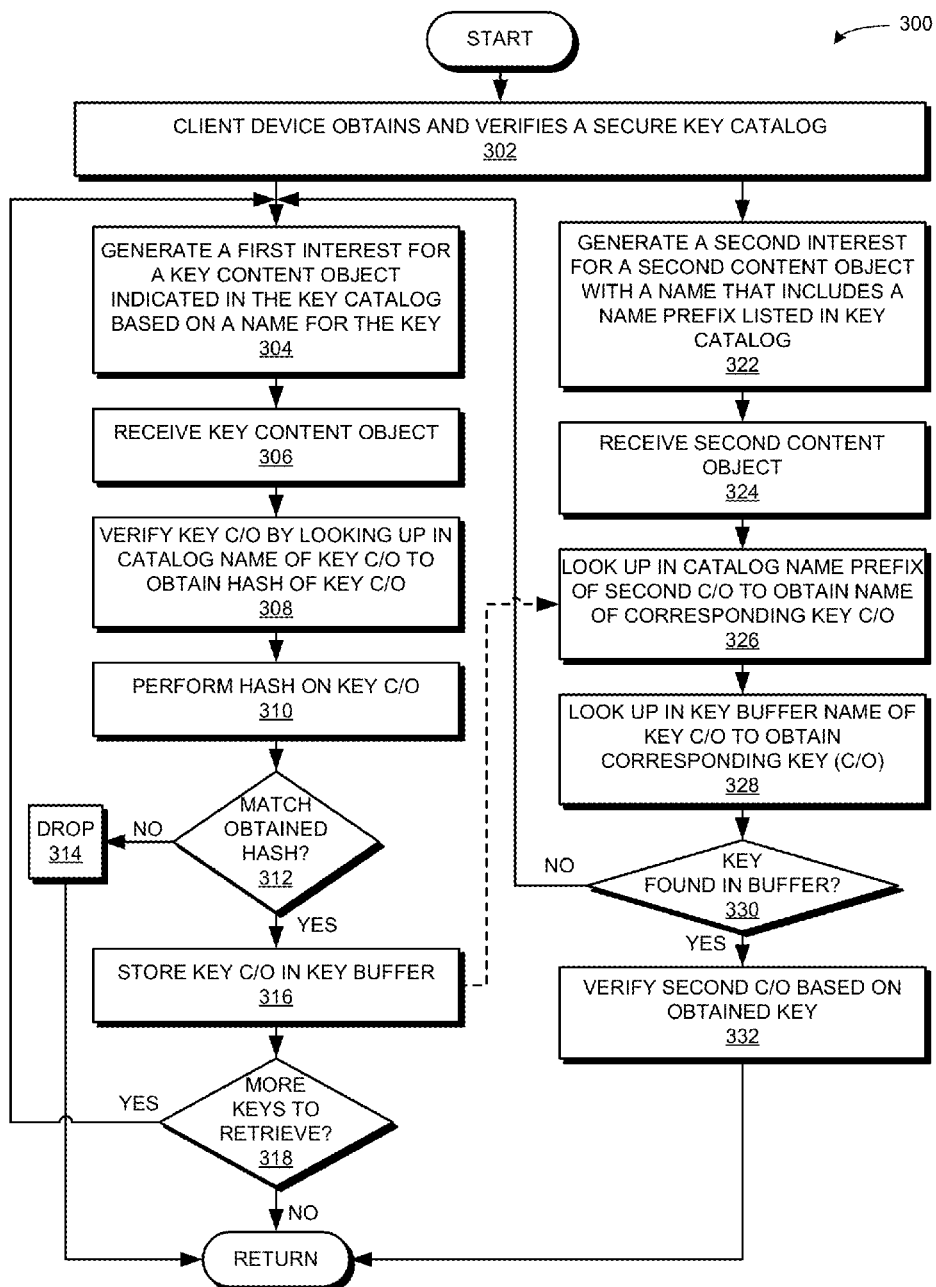
FIG. 3 presents a flow chart illustrating a method by a client computing device for retrieving and using keys indicated in a key catalog, in accordance with an embodiment of the present invention.

FIG. 3 presents a flow chart 300 illustrating a method by a client computing device for retrieving and using keys indicated in a key catalog, in accordance with an embodiment of the present invention. During operation, a client computing device obtains and verifies a secure key catalog (operation 302). The key catalog can be signed by the producer of the catalog based on a private key of the producer, and the client device can verify the signature based on a public key of the producer. Next, the client device can generate two interests based on a specific name prefix from the key catalog: a first interest for a specific key; and a second interest for content. The client device can send out the first interest for the key (operation 304) either before or at the same time that the client device sends out the second interest for the content object (operation 322). By obtaining the key before or in parallel with obtaining the content, the client device can avoid the delay required for an extra and sequential interest for the key after the content is returned.

The client device can generate a first interest for a content object that corresponds to a key indicated in the key catalog based on a name for the key (operation 304). The client device can receive the responsive key content object (operation 306) and verify the key content object by looking up in the catalog the name of the key content object to obtain the corresponding hash of the key content object (operation 308). The catalog can be stored in a data structure that is the same as or separate from the key buffer which is used to store the actual keys. The client device performs a hash on the received key content object (operation 310) and determines whether the result matches the obtained hash (from the lookup in operation 308). If the result does not match, the client device drops the packet corresponding to the key content object (operation 314). If the result does match, the client device stores the key content object in the key buffer (operation 316). The client device determines if there are any more keys retrieve, as indicated in the catalog (operation 318). If there are more keys to retrieve, the client devices generates another interest for the corresponding key based on the name prefix, and the operation continues as described at operation 304. If there are no more keys to retrieve, the operation returns.

The client device can generate a second interest for content based on a name prefix indicated in the key catalog (e.g., a second content object), where the second interest has a name that includes that name prefix (operation 322). The client device can receive the responsive second content object (operation 324) and lookup in the catalog (or other data structure representing the catalog) the name prefix of the second content object to obtain the name of the corresponding key content object (operation 326). The client device can also look up in the key buffer the name of the key content object to obtain the corresponding key content object (operation 328). In some embodiments, the catalog contents (e.g., the association between the name prefix, the key name, and the key hash) are stored in the key buffer along with the actual key content object.

If the key is found in the buffer (decision 330), the client device uses the key to verify the second content object (operation 332) and the operation returns. If the key is not found in the buffer (implying that the client device has not yet obtained the corresponding key, as shown in operations 304, 306, 308, 310, 312, and 316) (decision 330), the client device can execute those operations and proceed with operation 326 (as shown by the dotted line from operation 316 to operation 326). Decision 330 can also occur before operations 322 or between any of operations 322, 324, 326, and 328. In other words, obtaining the corresponding key can occur either before or in parallel with obtaining the content for a particular namespace.

Client Computing Device Processes Key Catalog

Figure 4:
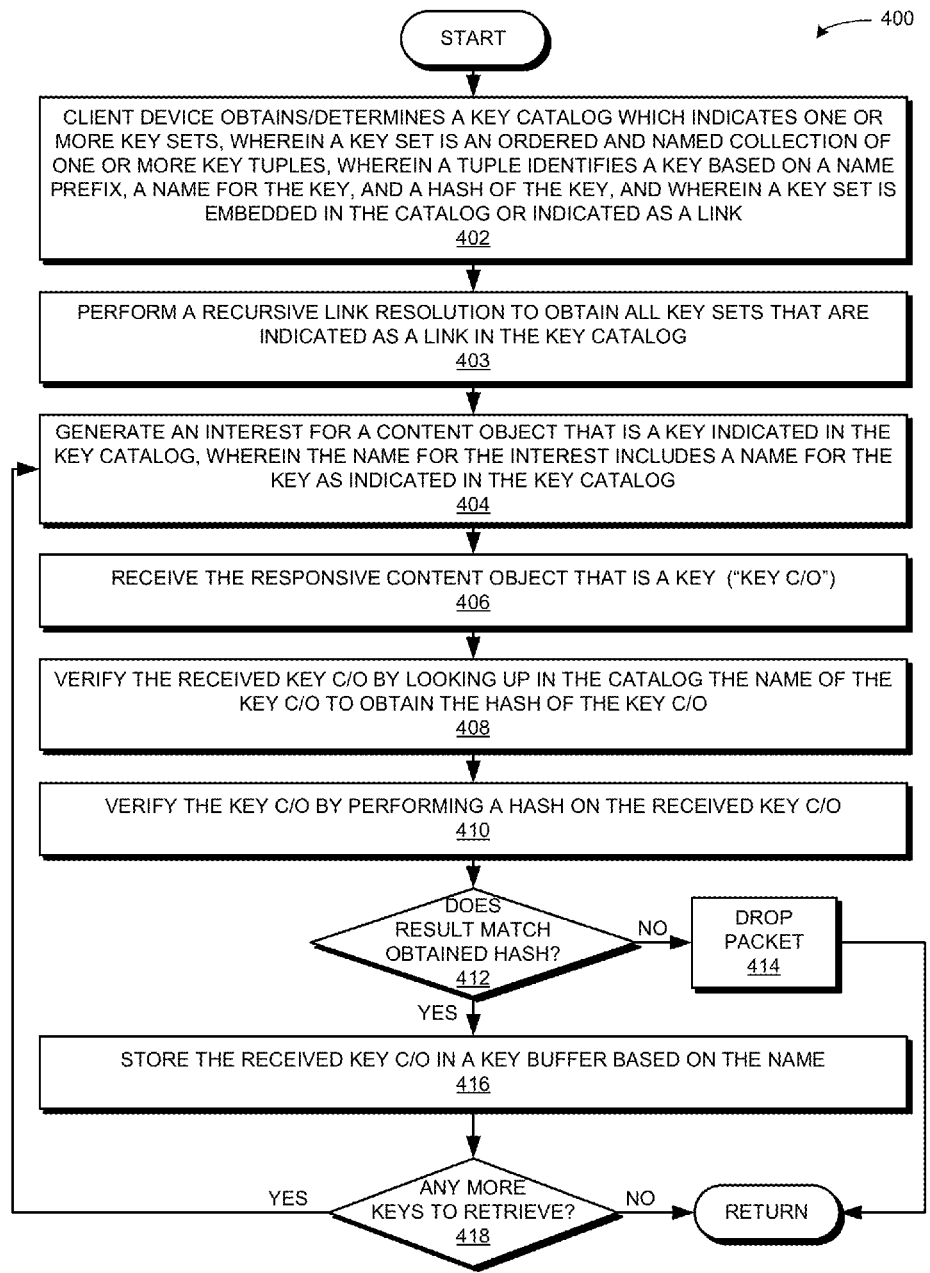
FIG. 4 presents a flow chart illustrating a method by a client computing device for processing a key catalog by retrieving all keys indicated in the key catalog, in accordance with an embodiment of the present invention.

FIG. 4 presents a flow chart 400 illustrating a method by a client computing device for processing a key catalog by retrieving all keys indicated in the key catalog, in accordance with an embodiment of the present invention. During operation, a client computing device obtains a key catalog which indicates one or more key sets, wherein a key set is an ordered and named collection of one or more key tuples, wherein a key tuple identifies a key based on a name prefix associated with the respective key, a name for the key, and a hash of the key, and wherein a key set can be embedded in the catalog or indicated as a link (operation 402). The client device performs a recursive link resolution to obtain all key sets that are indicated as a link in the key catalog (operation 403 and as described in relation to FIG. 2D). The client device generates an interest for a content object that is a key indicated in the key catalog, wherein the name for the interest includes a name for the key as indicated in the key catalog (operation 404). The interest also includes a hash restriction equal to a hash of the key as indicated in the catalog. The client device receives the responsive content object that is a key ("key content object") (operation 406). The client device verifies the received key content object by looking up in the catalog or other data structure the name of the key content object to obtain the corresponding hash of the key content object (operation 408). The client device verifies the key content object by performing a hash on the received key content object (operation 410), and subsequently determines whether the result of the hash matched the obtained hash from operation 408 (decision 412). If the result does not match, the client device drops the corresponding packet (operation 414). If the result does match, the client device stores the received key content object in a key buffer based on the name for the key content object (operation 416).

The client device determines if there are any more keys retrieve, as indicated in the catalog (operation 418). The client device can track or mark whether a key indicated in the catalog has been retrieved and/or stored. If there are more keys to retrieve, the client devices generates another interest for the corresponding key based on the name prefix, and the operation continues as described at operation 404. If there are no more keys to retrieve, the operation returns.

Content Producing Device Creates Key Catalog

Figure 5:
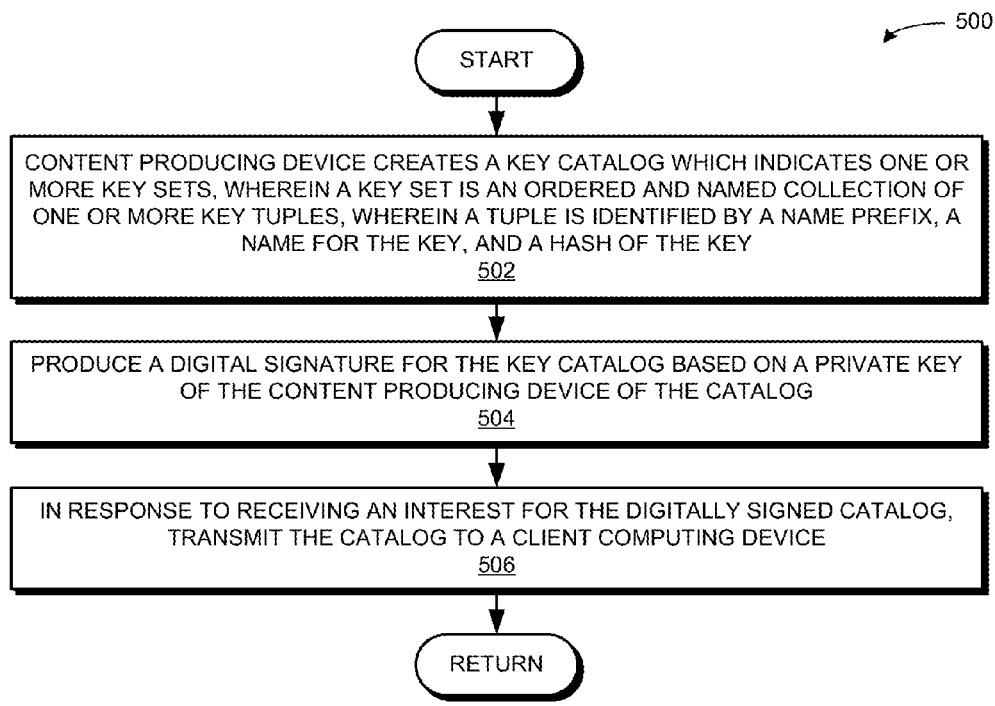
FIG. 5 presents a flow chart illustrating a method by a content producing device for creating a key catalog that facilitates efficient key retrieval in a CCN, in accordance with an embodiment of the present invention.

FIG. 5 presents a flow chart 500 illustrating a method by a content producing device for creating a key catalog that facilitates efficient key retrieval in a CCN, in accordance with an embodiment of the present invention. During operation, a content producing device creates a key catalog which indicates one or more key sets, wherein a key set is an ordered and named collection of one or more key tuples, wherein a key tuple is identified by a name prefix associated with the respective key, a name for the key, and a hash of the key (operation 502). A key set can be embedded in the catalog or indicated as a link. The content producing device produces a digital signature for the key catalog based on a private key of the content producing device of the catalog (operation 504). In response to receiving an interest for the digitally signed key catalog, the content producing device transmits the catalog to a client computing device (operation 506).

Exemplary Apparatus and Computer System

Figure 6:
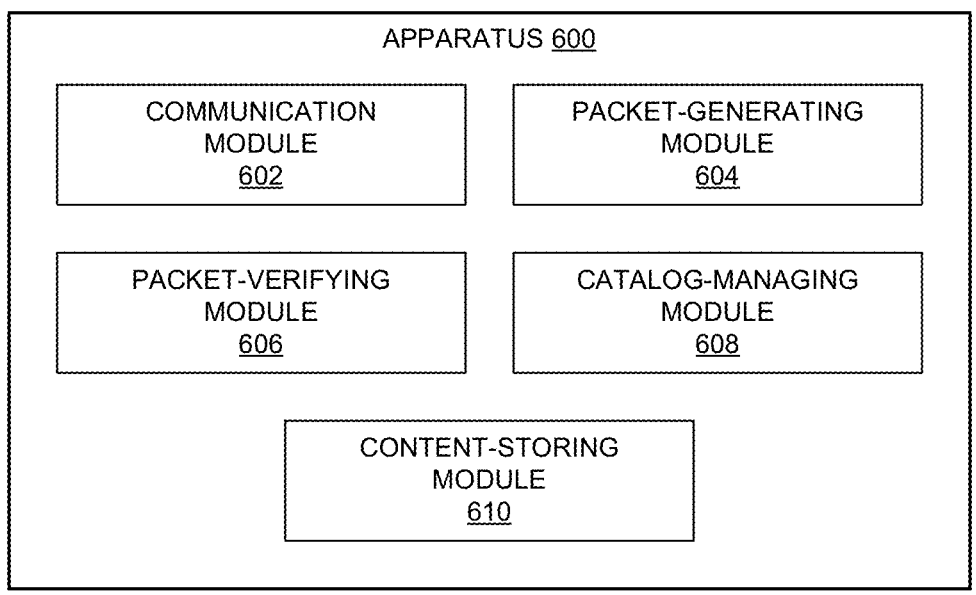
FIG. 6 illustrates an exemplary apparatus that facilitates efficient key retrieval in a CCN, in accordance with an embodiment of the present invention.

FIG. 6 illustrates an exemplary apparatus 600 that facilitates explicit content deletion commands, in accordance with an embodiment of the present invention. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, a packet-generating module 604, a packet-verifying module 606, a catalog-managing module 608, and a content-storing module 610.

In some embodiments, communication module 602 can send and/or receive data packets to/from other network nodes across a computer network, such as a content centric network. A data packet can include an interest packet or a content object packet with a name. A data packet can also include a digitally signed key catalog or a key indicated in the key catalog. Packet-generating module 604 can generate a first interest for a key indicated in a signed key catalog. Packet-verifying module 606 can, in response to receiving the key, verify the received key by determining that a hash of the received key matches a hash of the key as indicated in the catalog based on a name for the received key. Packet-generating module 604 can generate a second interest for a content object, wherein a name for the second interest includes a name prefix associated with the key as indicated in the catalog, wherein the first interest is transmitted before or concurrent with transmitting the second interest. Packet-verifying module 606 can, in response to receiving the content object, verify the received content object based on the key.

Packet-generating module 604 can generate an initial interest for the signed key catalog, which is signed with a private key of a content producing device of the catalog. Packet-verifying module 606 can, in response to receiving the signed key catalog, verify the signature based on a public key of the content producing device of the catalog.

Content-storing module 610 can store the received key in a data structure based on the name for the received key and a name prefix associated with the received key as indicated in the catalog. Catalog-managing module 608 can look up in the catalog the name prefix included in the second interest to obtain the name of a corresponding key, and can look up in the data structure the name of the corresponding key to obtain the corresponding key. Catalog-managing module 608 can look up in the data structure the name prefix included in the second interest and the name of the corresponding key to obtain the corresponding key.

Catalog-managing module 608 can also create a key catalog that indicates a collection of key sets, wherein a key set indicates one or more keys based on a name prefix associated with a respective key, a name for the respective key, and a hash of the respective key. Catalog-managing module 608 can also produce a digital signature for the key catalog based on a private key of a content producing device of the catalog. Communication module 602 can, in response to receiving an interest for the digitally signed key catalog, transmit the catalog to a client computing device.

Figure 7:
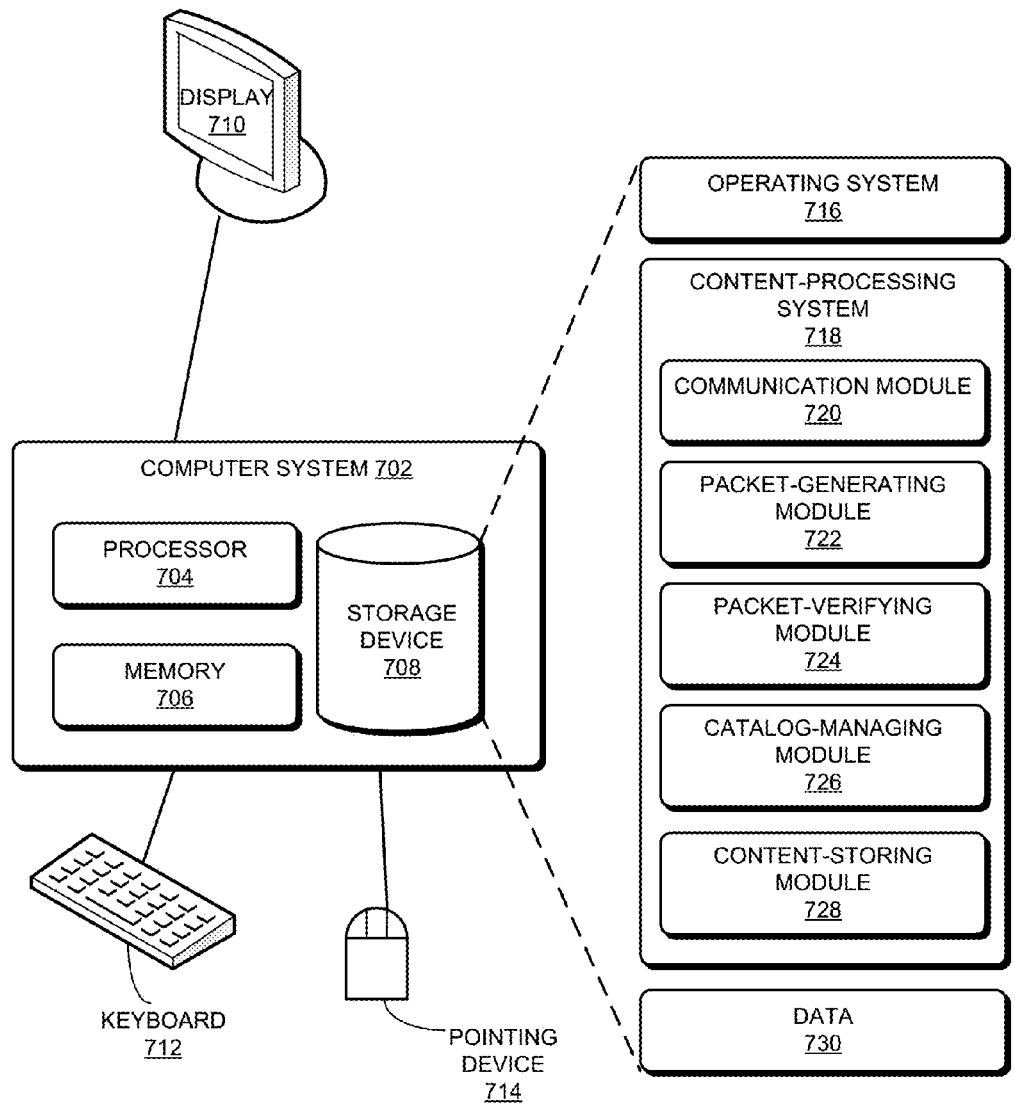
FIG. 7 illustrates an exemplary computer and communication system that facilitates efficient key retrieval in a CCN, in accordance with an embodiment of the present invention.

FIG. 7 illustrates an exemplary computer and communication system that facilitates explicit content deletion commands, in accordance with an embodiment of the present invention. Computer and communication system 702 includes a processor 704, a memory 706, and a storage device 708. Memory 706 can include a volatile memory (e.g., RAM) that serves as a managed memory, and can be used to store one or more memory pools. Furthermore, computer and communication system 702 can be coupled to a display device 710, a keyboard 712, and a pointing device 714. Storage device 708 can store an operating system 716, a content-processing system 718, and data 730.

Content-processing system 718 can include instructions, which when executed by computer and communication system 702, can cause computer and communication system 702 to perform methods and/or processes described in this disclosure. Specifically, content-processing system 718 may include instructions for generating a first interest for a key indicated in a signed key catalog (packet-generating module 722). Content-processing system 718 can include instructions for, in response to receiving the key (communication module 720), verifying the received key by determining that a hash of the received key matches a hash of the key as indicated in the catalog based on a name for the received key (packet-verifying module 724). Content-processing system 718 can include instructions for generating a second interest for a content object, wherein a name for the second interest includes a name prefix associated with the key as indicated in the catalog, wherein the first interest is transmitted before or concurrent with transmitting the second interest (packet-generating module 722). Content-processing system 718 can include instructions for, in response to receiving the content object (communication module 720), verifying the received content object based on the key (packet-verifying module 724).

Content-processing system 718 can further include instructions for generating an initial interest for the signed key catalog, which is signed with a private key of a content producing device of the catalog (packet-generating module 722). Content-processing system 718 can include instructions for, in response to receiving the signed key catalog (communication module 720), verifying the signature based on a public key of the content producing device of the catalog (packet-verifying module 724).

Content-processing system 718 can further include instructions for storing the received key in a data structure based on the name for the received key and a name prefix associated with the received key as indicated in the catalog (content-storing module 728). Content-processing system 718 can include instructions for looking up in the catalog the name prefix included in the second interest to obtain the name of a corresponding key, and looking up in the data structure the name of the corresponding key to obtain the corresponding key (catalog-managing module 726). Content-processing system 718 can also include instructions for looking up in the data structure the name prefix included in the second interest and the name of the corresponding key to obtain the corresponding key (catalog-managing module 726).

Content-processing system 718 can additionally include instructions for creating a key catalog that indicates a collection of key sets, wherein a key set indicates one or more keys based on a name prefix associated with a respective key, a name for the respective key, and a hash of the respective key (catalog-managing module 726). Content-processing system 718 can include instructions for producing a digital signature for the key catalog based on a private key of a content producing device of the catalog (catalog-managing module 726). Content-processing system 718 can include instructions for, in response to receiving an interest for the digitally signed key catalog, transmitting the catalog to a client computing device (communication module 720).

Data 730 can include any data that is required as input or that is generated as output by the methods and/or processes described in this disclosure. Specifically, data 730 can store at least: a packet that corresponds to an interest or a content object; an interest for a key; an interest for content; a key; a digital certificate; a signed key catalog; one or more key sets, where a key set indicates one or more key tuples, where a key tuple indicates a respective key based on a name prefix associated with the respective key, a name for the respective key, and a hash of the respective key; a name prefix; a name for a key; a hierarchically structured variable length identifier; a hash of a key; a data structure; a data structure that can store a mapping between a name prefix, a key name, and a key hash; and a data structure or buffer that can store a mapping between a name prefix and a key name, and a content object that is a key.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system to facilitate key retrieval, comprising:
   a processor;
   a storage device coupled to the processor and storing instructions that when executed by a computer cause the computer to perform a method, the method comprising:

generating, by a client computing device, a first interest for a key indicated in a signed key catalog, wherein the key indicated in the signed key catalog is embedded within a key set such that a request for another key within the signed key catalog functions as the first interest, wherein the signed key catalog comprises a link to a chunked key stream partitioned based on a chunking protocol;

in response to receiving the key as a received key, verifying the received key by determining that a hash of the received key matches a hash of the key as indicated in the catalog based on a name for the received key;

generating a second interest for a content object, wherein a name for the second interest includes a name prefix associated with the key as indicated in the catalog, wherein the first interest is transmitted before or concurrent with transmitting the second interest; and in response to receiving the content object, verifying the received content object based on the key.

2. The computer system of claim 1, wherein the method further comprises:

generating an initial interest for the signed key catalog, wherein the catalog is digitally signed with a private key of a content producing device of the catalog; and in response to receiving the signed key catalog, verifying the signature based on a public key of the content producing device of the catalog.

3. The computer system of claim 1, wherein the catalog is a content object with a name that is a hierarchically structured variable length identifier which comprises contiguous name components ordered from a most general level to a most specific level.

4. The computer system of claim 1, wherein the catalog indicates a collection of key sets, wherein a key set indicates one or more keys based on a name prefix associated with a respective key, a name for the respective key, and a hash of the respective key.

5. The computer system of claim 1, wherein a name for the first interest includes a name for the first key as indicated in the catalog, and wherein the first interest indicates a hash restriction equal to a hash of the first key as indicated in the catalog.

6. The computer system of claim 1, wherein the method further comprises:

storing the received key in a data structure based on the name for the received key and a name prefix associated with the received key as indicated in the catalog.

7. The computer system of claim 1, wherein verifying the received content object further comprises obtaining the key from a data structure, which involves:

looking up in the catalog the name prefix included in the second interest to obtain the name of a corresponding key; and looking up in the data structure the name of the corresponding key to obtain the corresponding key.

8. The computer system of claim 1, wherein the method further comprises:

storing, for each of one or more keys indicated in the catalog, in a data structure a mapping between a name prefix associated with a respective key, a name for the respective key, and a hash of the respective key.

9. The computer system of claim 8, wherein verifying the received content object further comprises obtaining the key from a data structure, which involves:

looking up in the data structure the name prefix included in the second interest and the name of the corresponding key to obtain the corresponding key.

10. A computer-implemented method to facilitate key retrieval, the method comprising:

generating, by a client computing device, a first interest for a key indicated in a signed key catalog, wherein the key indicated in the signed key catalog is embedded within a key set such that a request for another key within the signed key catalog functions as the first interest, wherein the signed key catalog comprises a link to a chunked key stream partitioned based on a chunking protocol;

in response to receiving the key as a received key, verifying the received key by determining that a hash of the received key matches a hash of the key as indicated in the catalog based on a name for the received key;

generating a second interest for a content object, wherein a name for the second interest includes a name prefix associated with the key as indicated in the catalog, wherein the first interest is transmitted before or concurrent with transmitting the second interest; and in response to receiving the content object, verifying the received content object based on the key.

11. The method of claim 10, further comprising:

generating an initial interest for the signed key catalog, wherein the catalog is digitally signed with a private key of a content producing device of the catalog; and in response to receiving the signed key catalog, verifying the signature based on a public key of the content producing device of the catalog.

12. The method of claim 10, wherein the catalog is a content object with a name that is a hierarchically structured variable length identifier which comprises contiguous name components ordered from a most general level to a most specific level.

13. The method of claim 10, wherein the catalog indicates a collection of key sets, wherein a key set indicates one or more keys based on a name prefix associated with a respective key, a name for the respective key, and a hash of the respective key.

14. The method of claim 10, wherein a name for the first interest includes a name for the first key as indicated in the catalog, and wherein the first interest indicates a hash restriction equal to a hash of the first key as indicated in the catalog.

15. The method of claim 10, further comprising:

storing the received key in a data structure based on the name for the received key and a name prefix associated with the received key as indicated in the catalog.

16. The method of claim 10, wherein verifying the received content object further comprises obtaining the key from a data structure, which involves:

looking up in the catalog the name prefix included in the second interest to obtain the name of a corresponding key; and looking up in the data structure the name of the corresponding key to obtain the corresponding key.

17. The method of claim 10, further comprising:

storing, for each of one or more keys indicated in the catalog, in a data structure a mapping between a name prefix associated with a respective key, a name for the respective key, and a hash of the respective key.

18. The method of claim 17, wherein verifying the received content object further comprises obtaining the key from a data structure, which involves:

looking up in the data structure the name prefix included in the second interest and the name of the corresponding key to obtain the corresponding key.

19. A computer system to facilitate key retrieval, comprising:
- a processor;
- a storage device coupled to the processor and storing instructions that when executed by a computer cause the computer to perform a method, the method comprising creating, by a content producing device, a key catalog that indicates a collection of key sets, wherein a key set indicates one or more keys based on a name prefix associated with a respective key, a name for the respective key, and a hash of the respective key; and
- producing a digital signature for the key catalog based on a private key of the content producing device of the catalog,
- wherein a given key in the key catalog is embedded within a given key set such that a request for another key within the key catalog functions as a first interest in a content-centric network, and
- wherein the signed key catalog comprises a link to a chunked key stream partitioned based on a chunking protocol.

20. The computer system of claim 19, wherein the method further comprises:
- in response to receiving an interest for the digitally signed key catalog, transmitting the catalog to a client computing device.

\* \* \* \* \*